(12) United States Patent
Suzuki (10) Patent No.: US 11,112,677 B2
(45) Date of Patent: Sep. 7, 2021

(54) FOCAL-PLANE SHUTTER AND IMAGING DEVICE

(71) Applicant: Nidec Copal Corporation, Tokyo (JP)

(72) Inventor: Yusuke Suzuki, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 0 days.

(21) Appl. No.: 16/777,810

(22) Filed: Jan. 30, 2020

(65) Prior Publication Data
US 2020/0249546 A1 Aug. 6, 2020

(30) Foreign Application Priority Data
Jan. 31, 2019 (JP) .............................. JP2019-16254

(51) Int. Cl.
*G03B 9/14* (2021.01)
*G03B 9/40* (2021.01)

(52) U.S. Cl.
CPC ................ *G03B 9/40* (2013.01); *G03B 9/14* (2013.01)

(58) Field of Classification Search
CPC .................................... G03B 9/14; G03B 9/40
See application file for complete search history.

(56) References Cited

U.S. PATENT DOCUMENTS

| 2011/0019070 | A1* | 1/2011 | Moon | H04N 5/353 348/362 |
|---|---|---|---|---|
| 2014/0010526 | A1 | 1/2014 | Takahashi et al. | |
| 2015/0341574 | A1 | 11/2015 | Takahashi et al. | |
| 2020/0012172 | A1* | 1/2020 | Irie | H04N 5/2254 |

FOREIGN PATENT DOCUMENTS

| JP | 2013-130652 A | 7/2013 |
|---|---|---|
| JP | 2014-191225 A | 10/2014 |

* cited by examiner

*Primary Examiner* — Minh Q Phan
(74) *Attorney, Agent, or Firm* — Hauptman Ham, LLP (57) ABSTRACT

A focal-plane shutter for electronic front curtain scanning allows blades to move in two directions across the opening in a balanced manner, rather than in one direction. The focal-plane shutter for electronic front curtain scanning includes a base plate having an opening, a first blade movable in a first direction to close the opening, a second blade movable in a second direction to close the opening and opposite to the first direction in which the first blade is movable, a first urging member that urges the first blade in the first direction to close the opening, and a second urging member that urges the second blade in the second direction to close the opening.

6 Claims, 8 Drawing Sheets

FOCAL-PLANE SHUTTER AND IMAGING DEVICE

RELATED APPLICATIONS

The present application claims priority to Japanese Application Number 2019-16254, filed Jan. 31, 2019, the disclosure of which is hereby incorporated by reference herein in its entirety.

BACKGROUND

Technical Field

An aspect of the present invention relates to a focal-plane shutter for an imaging device such as a camera.

Description of the Background

A focal-plane shutter exposes an image sensor to light by moving a front blade (or front curtain) and a rear blade (or rear curtain) across an opening in a manner to form a slit between them. Such a focal-plane shutter may have a spring attached to an arm connected to each blade to reduce rattling of the blades or to prevent unintentional closing of the opening. For example, Patent Literature 1 describes a structure including urging members that urge a front curtain and a rear curtain to retract from an opening.

CITATION LIST

Patent Literature

Patent Literature 1: Japanese Unexamined Patent Application Publication No. 2013-130652

BRIEF SUMMARY

In the structure described in Patent Literature 1, a first urging member 60a and a second urging member 60b urge a front curtain 20A and a rear curtain 20B to retract from an opening 11. However, when the blades in the structure are moved to capture an image, the start of the rear curtain 20B is delayed by the second urging member 60b urging the rear curtain 20B in a direction opposite to the direction in which the rear curtain 20B moves. Although having an urging force below the starting torque (T7b min) of a rotor 71b, the second urging member 60b reduces initial velocity, which particularly affects image capturing more adversely as the shutter speed increases.

In response to the above issue, one or more aspects of the present invention are directed to the structures described below. The reference numerals or other labels in parentheses herein denote the corresponding components in the figures to facilitate understanding of the aspects of the present invention. However, the components with such reference numerals do not limit the components according to the aspects of the present invention, which should be construed broadly within the scope technically understandable by those skilled in the art.

A focal-plane shutter for electronic front curtain scanning according to a first aspect of the present invention includes a base plate (1) having an opening (1a), a first blade (2) movable in a first direction to close the opening (1a), a second blade (3) movable in a second direction to close the opening (1a) and opposite to the first direction in which the first blade (2) is movable, a first urging member (42b) that urges the first blade (2) in the first direction to close the opening (1a), and a second urging member (52b) that urges the second blade (3) in the second direction to close the opening (1a).

The focal-plane shutter with the above structure using electronic front curtain scanning uses the urging members to apply an urging force to the first blade and the second blade in their closing directions. When the first blade and the second blade close the opening, this structure increases the initial velocity immediately after each blade starts moving, thus achieving a higher shutter speed and a higher consecutive shooting speed.

In the focal-plane shutter with the above structure, in image capturing, the first blade or the second blade may close the opening later than an electronic scanning line of an image sensor.

The focal-plane shutter with the above structure selectively moves the electronic front curtain scanning and the blade functioning as a rear blade during image capturing to reduce the shutter sound and power consumption.

In the focal-plane shutter with the above structure, in image capturing, the first blade may move in the first direction or the second blade may move in the second direction to close the opening from a state in which the opening is uncovered by the first blade and the second blade.

The focal-plane shutter with the above structure can operate using the electronic front curtain scanning.

In the focal-plane shutter with the above structure, an image may be captured when the first blade moves in the first direction across the opening and when the second blade moves in the second direction across the opening.

The focal-plane shutter with the above structure enables high-speed image capturing by, for example, consecutively capturing images with the blades moving in each direction. Additionally, the focal-plane shutter may change the direction in which the blades move during image capturing depending on the orientation of the imaging device with respect to the force of gravity. This controls the blades to move in the direction of gravitational force independently of the orientation of the imaging device, thus enabling switching between different image-capturing modes and adjustment of the quality of the captured image.

In the focal-plane shutter with the above structure, in image capturing, from the state in which the opening is closed by the second blade, the second blade and the first blade may move while leaving a gap for light to enter the opening. After the opening is closed by the first blade, the first blade and the second blade may move while leaving a gap for light to enter the opening, and a scanning line of the electronic front curtain scanning may move within the gap.

The focal-plane shutter with the above structure enables high-speed consecutive image capturing with the blades moving in each direction at substantially the same speed.

The focal-plane shutter with the above structure may further include a first electromagnetic actuator that drives the first blade and a second electromagnetic actuator that drives the second blade.

The focal-plane shutter with the above structure drives the first blade and the second blade with the electromagnetic actuators, and achieves an appropriate balance between the urging forces applied to the first blade and the second blade by the urging members.

In the focal-plane shutter with the above structure, at least one of the first blade or the second blade may be driven by a drive spring in image capturing.

The focal-plane shutter with the above structure may use a drive spring having a high starting torque for the blade functioning as the rear blade. During image capturing, the drive spring cooperates with the urging member to further increase the initial velocity of the blade.

The focal-plane shutter according to any one of the above aspects is applicable to an imaging device.

The imaging device achieves a higher shutter speed, a higher consecutive shooting speed, less sound, and more power saving than known structures.

DETAILED DESCRIPTION

A focal-plane shutter according to one or more embodiments of the present invention exposes an image sensor to light by moving electronic front curtain scanning and by moving a first blade or a second blade in opposite directions across an opening. The focal-plane shutter includes urging members that urge the first blade and the second blade in the directions to close the opening.

The structures according to embodiments of the present invention will now be described with reference to the drawings. The embodiments described below are mere examples of the present invention, and should not be construed as limiting the technical scope of the invention. In the figures, the same components are given the same reference numerals, and may not be described.

1. First Embodiment
2. Second Embodiment
3. Features
4. Supplemental Examples

1. First Embodiment

A focal-plane shutter according to the present embodiment includes urging members that urge a first blade and a second blade in the directions to close an opening. In some cases, the first blade functions as a light shield blade, and the second blade functions as a rear blade. In other cases, the second blade functions as a light shield blade, and the first blade functions as a rear blade. Electronic front curtain scanning is used to capture an image. This will be described in detail.

Figure 1:
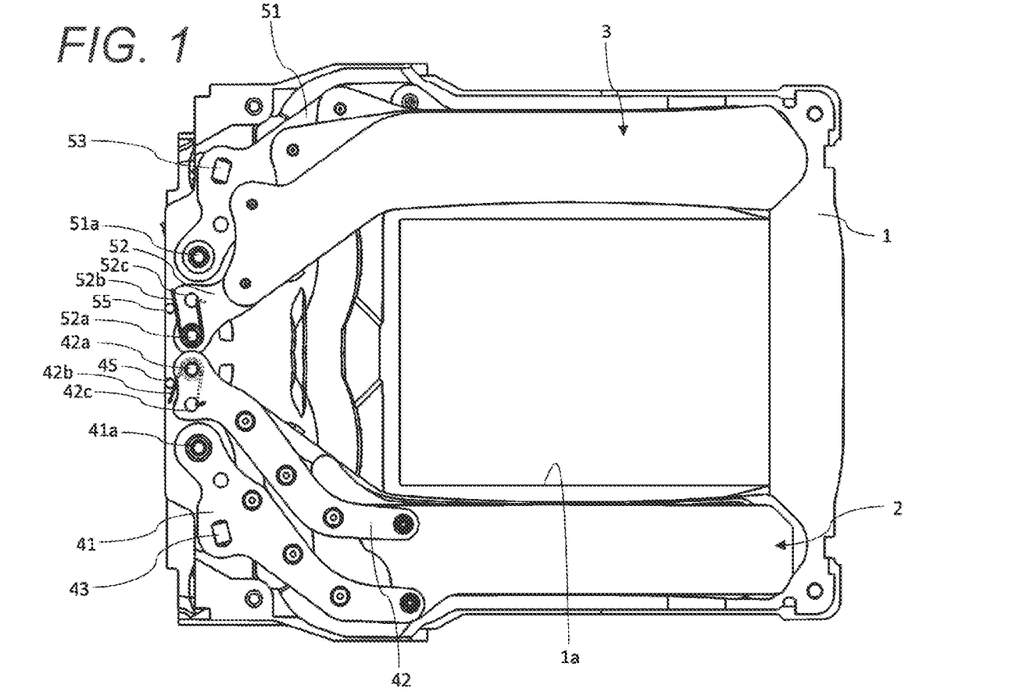
FIG. 1 is a plan view of a focal-plane shutter with its opening uncovered by a first blade and a second blade, showing the inside of a blade chamber without a support base plate or an intermediate plate.
Figure 2:
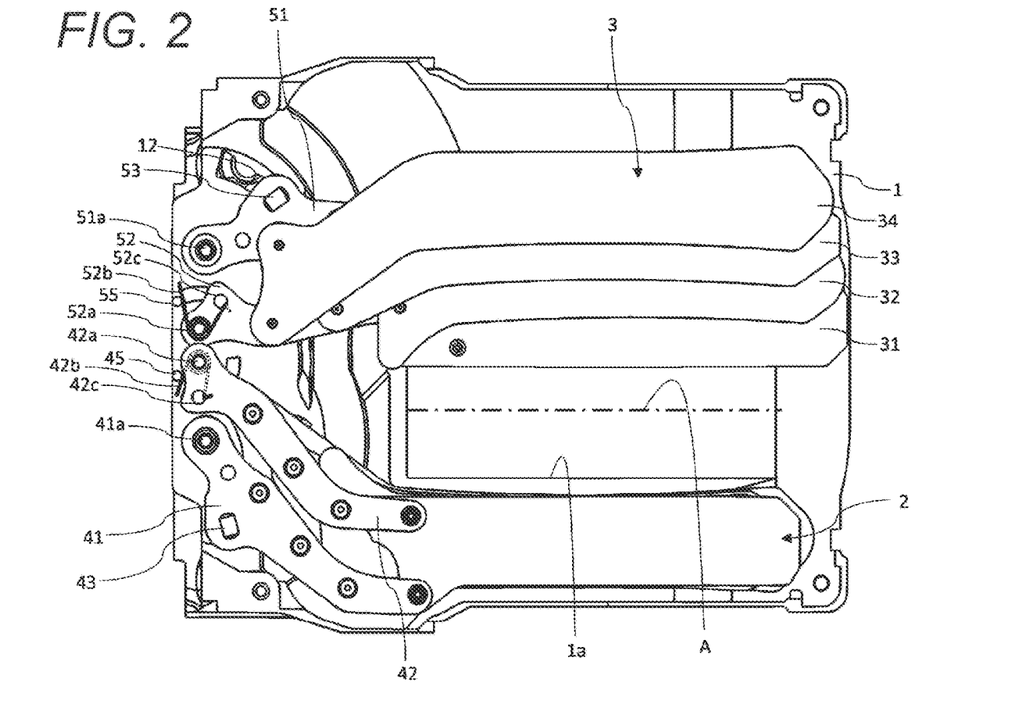
FIG. 2 is a plan view of the focal-plane shutter with the opening partially covered by the second blade, showing the inside of the blade chamber without the support base plate or the intermediate plate.
Figure 3:
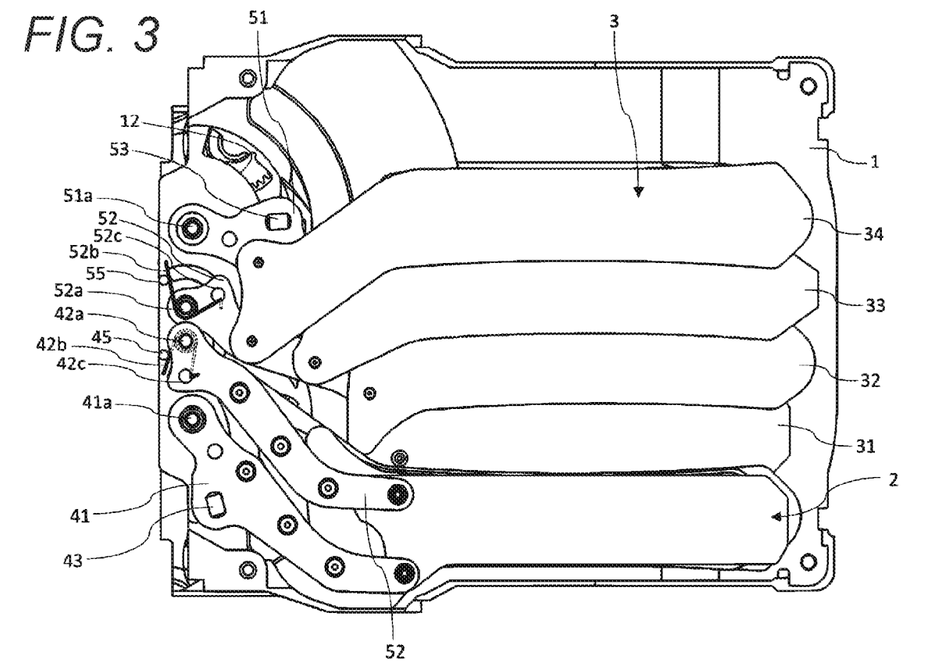
FIG. 3 is a plan view of the focal-plane shutter with the opening fully covered by the second blade, showing the inside of the blade chamber without the support base plate or the intermediate plate.
Figure 4:
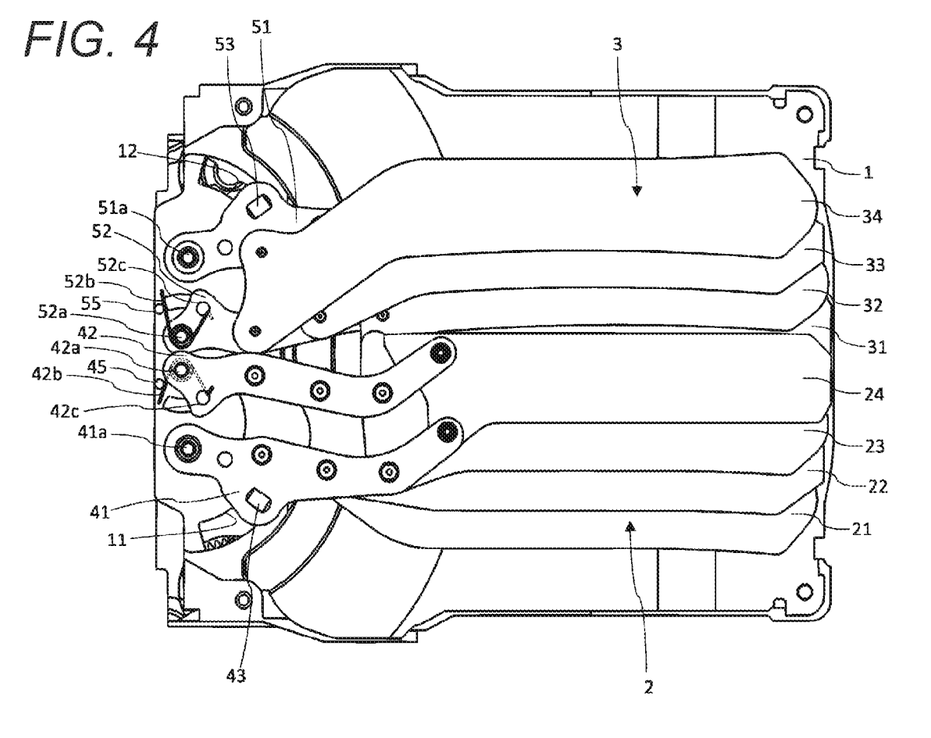
FIG. 4 is a plan view of the focal-plane shutter with the opening covered by the first blade and the second blade that are moving, showing the inside of the blade chamber without the support base plate or the intermediate plate.
Figure 5:
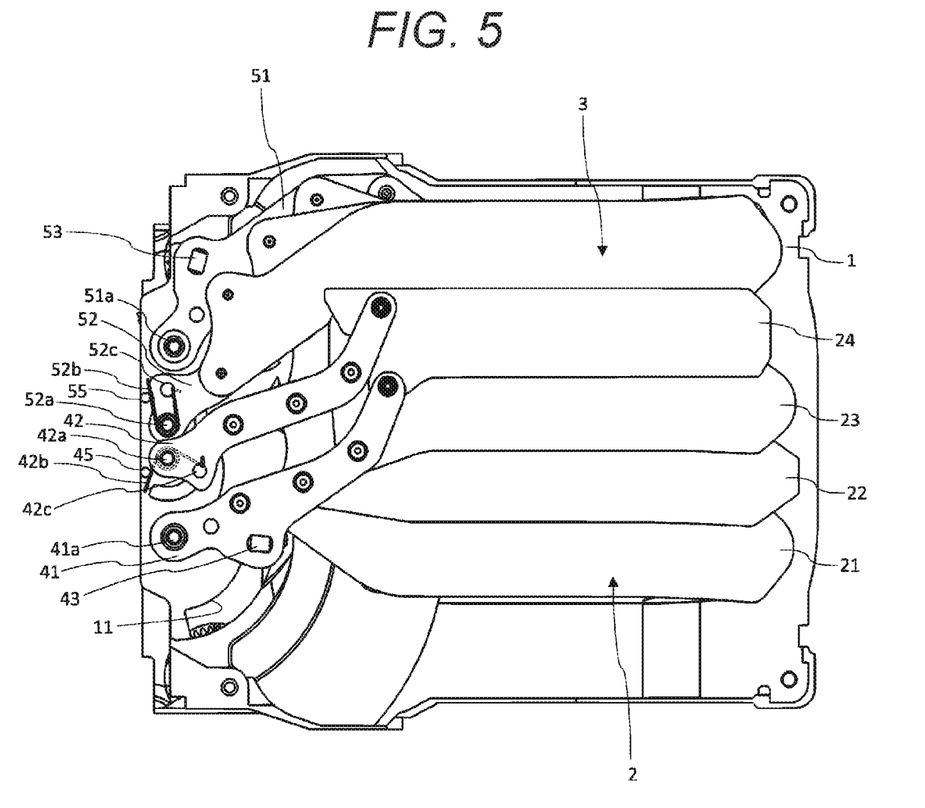
FIG. 5 is a plan view of the focal-plane shutter with the opening fully covered by the first blade, showing the inside of the blade chamber without the support base plate or the intermediate plate.

FIGS. 1 to 5 are plan views of the focal-plane shutter according to the present embodiment. FIG. 1 is a plan view with the opening uncovered by the first blade and the second blade, showing the inside of a blade chamber without a support base plate or an intermediate plate. FIG. 2 is a plan view of the focal-plane shutter with the opening partially covered by the second blade, showing the inside of the blade chamber without the support base plate or the intermediate plate. FIG. 3 is a plan view of the focal-plane shutter with the opening fully covered by the second blade, showing the inside of the blade chamber without the support base plate or the intermediate plate. FIG. 4 is a plan view of the focal-plane shutter with the opening covered by the first blade and the second blade that are moving, showing the inside of the blade chamber without the support base plate or the intermediate plate. FIG. 5 is a plan view of the focal-plane shutter with the opening fully covered by the first blade, showing the inside of the blade chamber without the support base plate or the intermediate plate. As described later, the focal-plane shutter according to the present embodiment sequentially changes its state in the order illustrated in FIGS. 1 to 5 and then returns to the state in FIG. 1 during a series of operations including image capturing.

Figure 6:
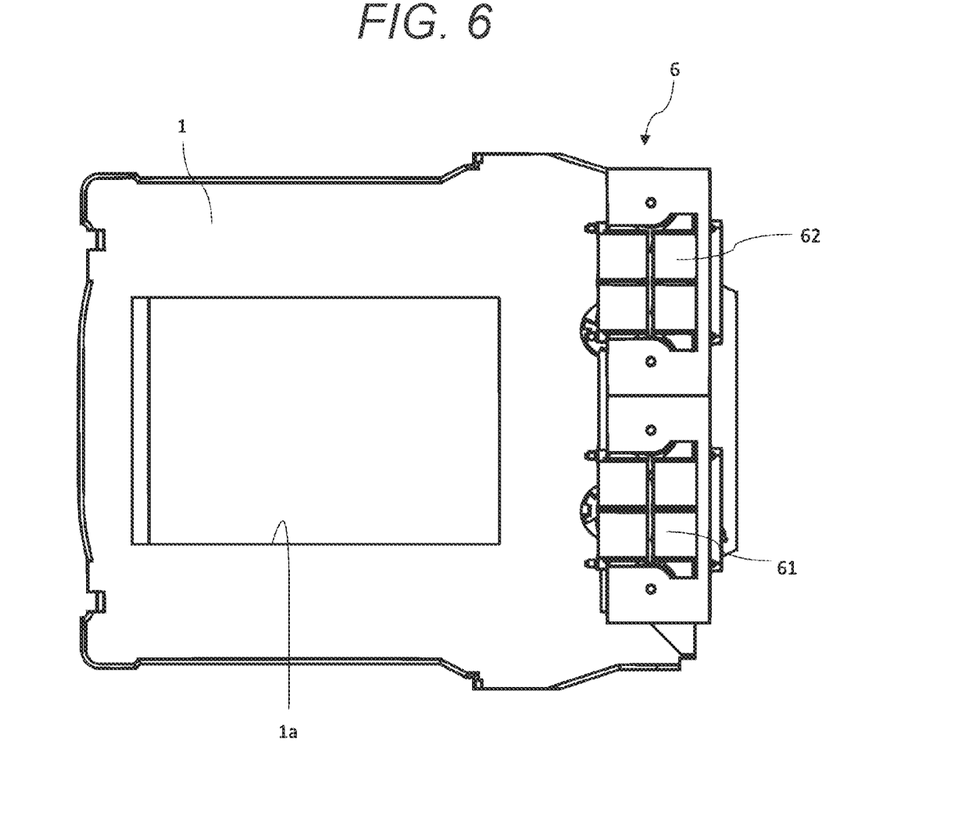
FIG. 6 is a plan view of the focal-plane shutter, showing the side on which a drive mechanism is mounted.

FIG. 6 is a plan view of the focal-plane shutter according to the present embodiment, showing the side on which a drive mechanism is mounted.

As illustrated, the focal-plane shutter according to the present embodiment includes a base plate 1, a first blade 2, a second blade 3, a first blade main arm 41, a first blade follower arm 42, a second blade main arm 51, and a second blade follower arm 52. The focal-plane shutter according to the present embodiment also includes a first blade drive pin 43, a first blade bias spring 42b, a second blade drive pin 53, and a second blade bias spring 52b. The focal-plane shutter according to the present embodiment includes, as shown in FIG. 6, a first blade electromagnetic actuator 61 and a second blade electromagnetic actuator 62. The first blade and the second blade herein may be collectively referred to as the blades. The first blade main arm 41 and the first blade follower arm 42 may be collectively referred to as the first blade arms. The second blade main arm 51 and the second blade follower arm 52 may be collectively referred to as the second blade arms. The first blade arms and the second blade arms may be collectively referred to as the arms. The components for driving the blades with the arms may be collectively referred to as the drive mechanism.

Base Plate 1

As shown in FIGS. 1 to 5, the base plate 1 is a base for the focal-plane shutter and has a substantially rectangular opening 1a. The opening 1a may be of any shape other than a rectangle. The base plate 1 has a drive mechanism 6 mounted adjacent to the opening 1a (on the left back side in the figures) for driving the first blade 2 and the second blade 3.

The base plate 1 includes upright shafts 41a, 42a, 51a, and 52a in a blade chamber described later. The shaft 41a is connected to the first blade main arm 41. The shaft 41a serves as the central axis of rotation of the first blade main arm 41. The shaft 42a is connected to the first blade follower arm 42. The shaft 42a serves as the central axis of rotation of the first blade follower arm 42. The shaft 42a receives the first blade bias spring 42b. The shaft 51a is connected to the second blade main arm 51. The shaft 51a serves as the central axis of rotation of the second blade main arm 51. The shaft 52a is connected to the second blade follower arm 52. The shaft 52a serves as the central axis of rotation of the second blade follower arm 52. The shaft 52a receives the second blade bias spring 52b.

The base plate 1 has upright shafts 45 and 55 in the blade chamber. The first blade bias spring 42b is held with its first arm hooked on the shaft 45. The shaft 45 fixes the first arm of the first blade bias spring 42b. The second blade bias spring 52b is held with its first arm hooked on the shaft 55. The shaft 55 fixes the first arm of the second blade bias spring 52b.

The base plate 1 has a long through-hole 11 formed as an arc about the shaft 41a, and a long through-hole 12 formed as an arc about the shaft 51a. The through-hole 11 receives the first blade drive pin 43, which receives an output from the first blade electromagnetic actuator 61. The through-hole 12 receives the second blade drive pin 53, which receives an output from the second blade electromagnetic actuator 62.

The focal-plane shutter has an image sensor (not shown) located opposite to the subject from the opening 1a in the base plate 1. The image sensor is, for example, a charge-coupled device (CCD) or a complementary metal-oxide-semiconductor (CMOS) image sensor and a photoelectric converter that converts incident light to electrical signals.

Support Base Plate and Intermediate Plate

The focal-plane shutter according to the present embodiment includes a support base plate and an intermediate plate, which are known and thus not shown. The support base plate has an opening facing the opening 1a in the base plate 1, and faces the base plate 1 at a predetermined distance from the base plate 1. The intermediate plate has an opening facing the opening 1a in the base plate 1, and is placed between the base plate 1 and the support base plate in the blade chamber, with a predetermined space left from each of the base plate 1 and the support base plate. The base plate 1 and the intermediate plate define a blade chamber between them for the first blade, whereas the support base plate and the intermediate plate define another blade chamber between them for the second blade.

First Blade 2

The first blade 2 includes blades 21 to 24. The first blade 2 is connected to the first blade main arm 41 and the first blade follower arm 42 with fasteners such as rivets in a known manner. The first blade 2 is placed between the base plate 1 and the intermediate plate (not shown). The first blade 2 is driven by the first blade drive pin 43 with the first blade main arm 41 to switch between states in which the light exposure opening corresponding to the opening 1a is covered and uncovered (open and closed states). The blades 21 to 24 included in the first blade 2 are each formed from, but not limited to, a metal such as aluminum, a carbon fiber, or a resin. In the present embodiment, the first blade 2 functions as a light shield blade (light shield curtain) and a rear blade (rear curtain).

Second Blade 3

The second blade 3 includes blades 31 to 34. The second blade 3 is connected to the second blade main arm 51 and the second blade follower arm 52 with fasteners such as rivets in a known manner. The second blade 3 is placed in the blade chamber as described above. The second blade 3 is driven by the second blade drive pin 53 with the second blade main arm 51 to switch between states in which the light exposure opening corresponding to the opening 1a is covered and uncovered (open and closed states). The blades 31 to 34 included in the second blade 3 are each formed from, but not limited to, a metal such as aluminum, a carbon fiber, or a resin. In the present embodiment, the second blade 3 functions as a light shield blade (light shield curtain) and a rear blade (rear curtain).

When the image sensor is exposed to light to capture an image, the first blade 2 and the second blade 3 move from above to below and from below to above across the opening 1a shown in FIGS. 1 to 5. Their specific movements during image capturing will be described later.

The first blade 2 and the second blade 3 in the present embodiment may be examples of a first blade and a second blade in an aspect of the present invention. In another aspect, the first blade 2 may be an example of the second blade, and the second blade 3 may be an example of the first blade.

First Blade Main Arm 41

The first blade main arm 41 is connected to the first blade drive pin 43 and the first blade 2. The first blade main arm 41 is pivotably connected to the shaft 41a on the base plate 1, and rotates about the shaft 41a. The first blade main arm 41 has a connection hole that receives the first blade drive pin 43. The first blade main arm 41 transmits the driving force generated by the operation of the first blade electromagnetic actuator 61 to the first blade 2 via the first blade drive pin 43.

First Blade Follower Arm 42

The first blade follower arm 42 is connected to the first blade 2. The first blade follower arm 42 is pivotably connected to the shaft 42a on the base plate 1, and rotates about the shaft 42a. The first blade follower arm 42 does not directly receive the driving force, and moves in coordination with the first blade main arm 41 with the force through the blades 21 to 24. The first blade follower arm 42 has a through-hole 42c, in which the first blade bias spring 42b is held with its second arm hooked.

Second Blade Main Arm 51

The second blade main arm 51 is connected to the second blade drive pin 53 and the second blade 3. The second blade main arm 51 is pivotably connected to the shaft 51a on the base plate 1, and rotates about the shaft 51a. The second blade main arm 51 has a connection hole that receives the second blade drive pin 53. The second blade main arm 51 transmits the driving force generated by the operation of the second blade electromagnetic actuator 62 to the second blade 3 via the second blade drive pin 53.

Second Blade Follower Arm 52

The second blade follower arm 52 is connected to the second blade 3. The second blade follower arm 52 is pivotably connected to the shaft 52a on the base plate 1, and rotates about the shaft 52a. The second blade follower arm 52 does not directly receive the driving force, and moves in coordination with the second blade main arm 51 with the force through the blades 31 to 34. The second blade follower arm 52 has a through-hole 52c, in which the second blade bias spring 52b is held with its second arm hooked.

First Blade Drive Pin 43

The first blade drive pin 43 is connected to the first blade main arm 41 and received in the through-hole 11. The first blade drive pin 43 is driven by the first blade electromagnetic actuator 61 to move in the through-hole 11 along an arc about the shaft 41a.

Second Blade Drive Pin 53

The second blade drive pin 53 is connected to the second blade main arm 51 and received in the through-hole 12. The second blade drive pin 53 is driven by the second blade electromagnetic actuator 62 to move in the through-hole 12 along an arc about the shaft 51a.

First Electromagnetic Actuator 61

The first blade electromagnetic actuator 61 includes a permanent magnet and a coil. The coil is energized with electricity to have a magnetic force. The first blade electromagnetic actuator 61 is connected to the first blade drive pin 43 to drive the first blade 2. The first blade electromagnetic actuator has a known structure and is also referred to as a motor.

Second Electromagnetic Actuator 62

The second blade electromagnetic actuator 62 includes a permanent magnet and a coil. The coil is energized with electricity to have a magnetic force. The second blade electromagnetic actuator 62 is connected to the second blade drive pin 53 to drive the second blade 3. The second blade electromagnetic actuator has a known structure and is also referred to as a motor.

First Blade Bias Spring 42b

The first blade bias spring 42b is a helical torsion spring and includes a coil, and a first arm and a second arm extending from the coil. The coil is wound around the shaft 42a. The first arm is hooked on the shaft 45 on the base plate 1. The second arm is hooked in the through-hole 42c in the first blade follower arm 42. The shaft 45 is stationary on the base plate 1. The first blade bias spring 42b thus applies a counterclockwise urging force to the first blade follower arm 42 with the second arm. The urging force applied from the first blade bias spring 42b urges the first blade 2 in a direction to close the opening 1a. The first blade bias spring 42b is a specific example of a first urging member in an aspect of the present invention. The first blade bias spring 42b may be any urging member other than a spring.

Second Blade Bias Spring 52b

The second blade bias spring 52b is a helical torsion spring and includes a coil, and a first arm and a second arm extending from the coil. The coil is wound around the shaft 52a. The first arm is hooked on the shaft 55 on the base plate 1. The second arm is hooked in the through-hole 52c in the second blade follower arm 52. The shaft 55 is stationary on the base plate 1. The second blade bias spring 52b thus applies a clockwise urging force to the second blade follower arm 52 with the second arm. The urging force applied from the second blade bias spring 52b urges the second blade 3 in a direction to close the opening 1a. The second blade bias spring 52b is a specific example of a second urging member in an aspect of the present invention. The second blade bias spring 52b may be any urging member other than a spring.

The urging force applied from the first blade bias spring 42b to the first blade 2 is symmetric with the urging force applied from the second blade bias spring 52b to the second blade 3. More specifically, in the figures, the urging force applied from the first blade bias spring 42b to the first blade 2 located below without covering the opening 1a is substantially the same as the urging force applied from the second blade bias spring 52b to the second blade 3 located above without covering the opening 1a. Additionally, the urging force applied from the first blade bias spring 42b to the first blade 2 that has closed the opening 1a is substantially the same as the urging force applied from the second blade bias spring 52b to the second blade 3 that has closed the opening 1a.

Figure 7:
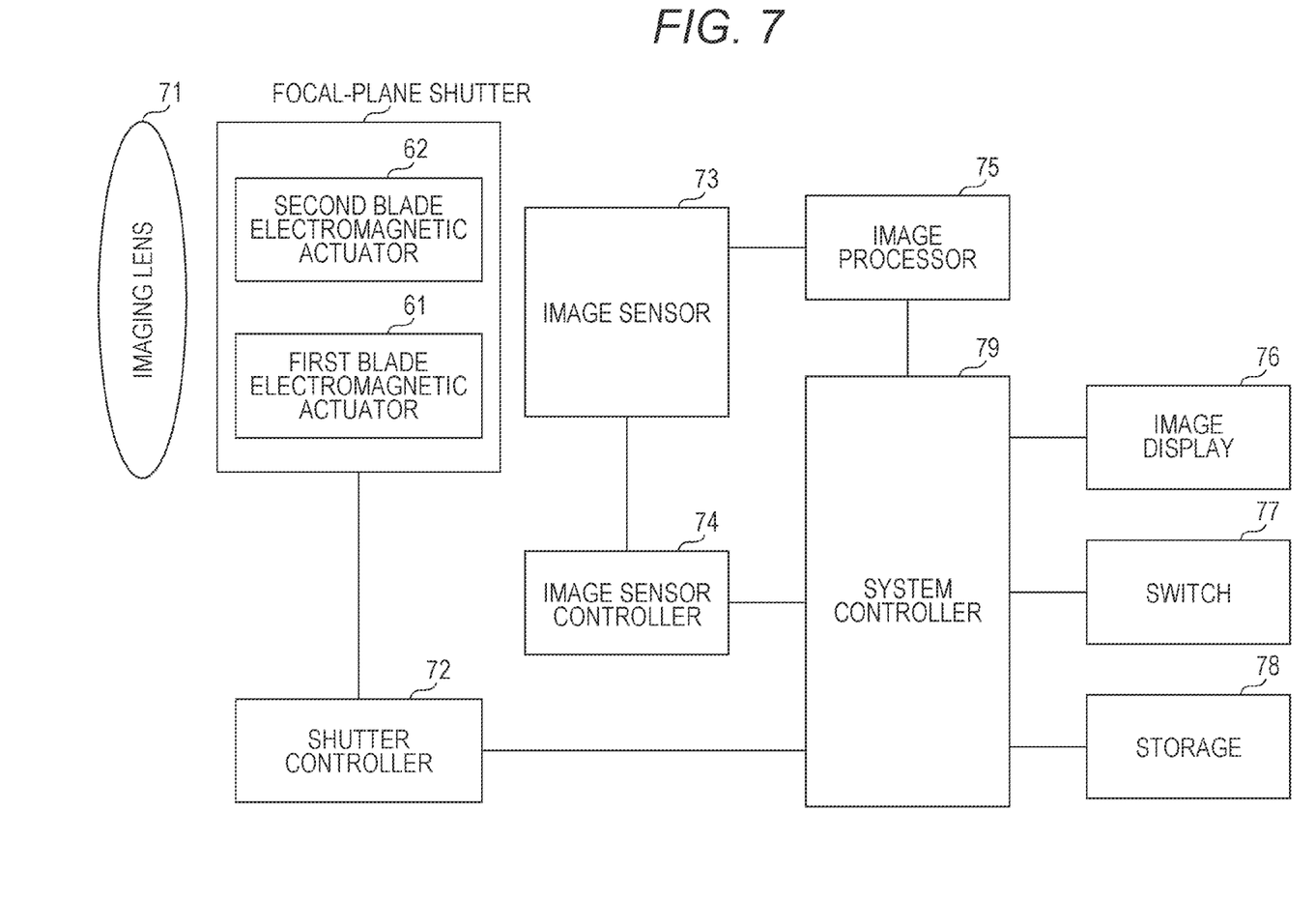
FIG. 7 is a functional block diagram of an image sensor including the focal-plane shutter.
Figure 8:
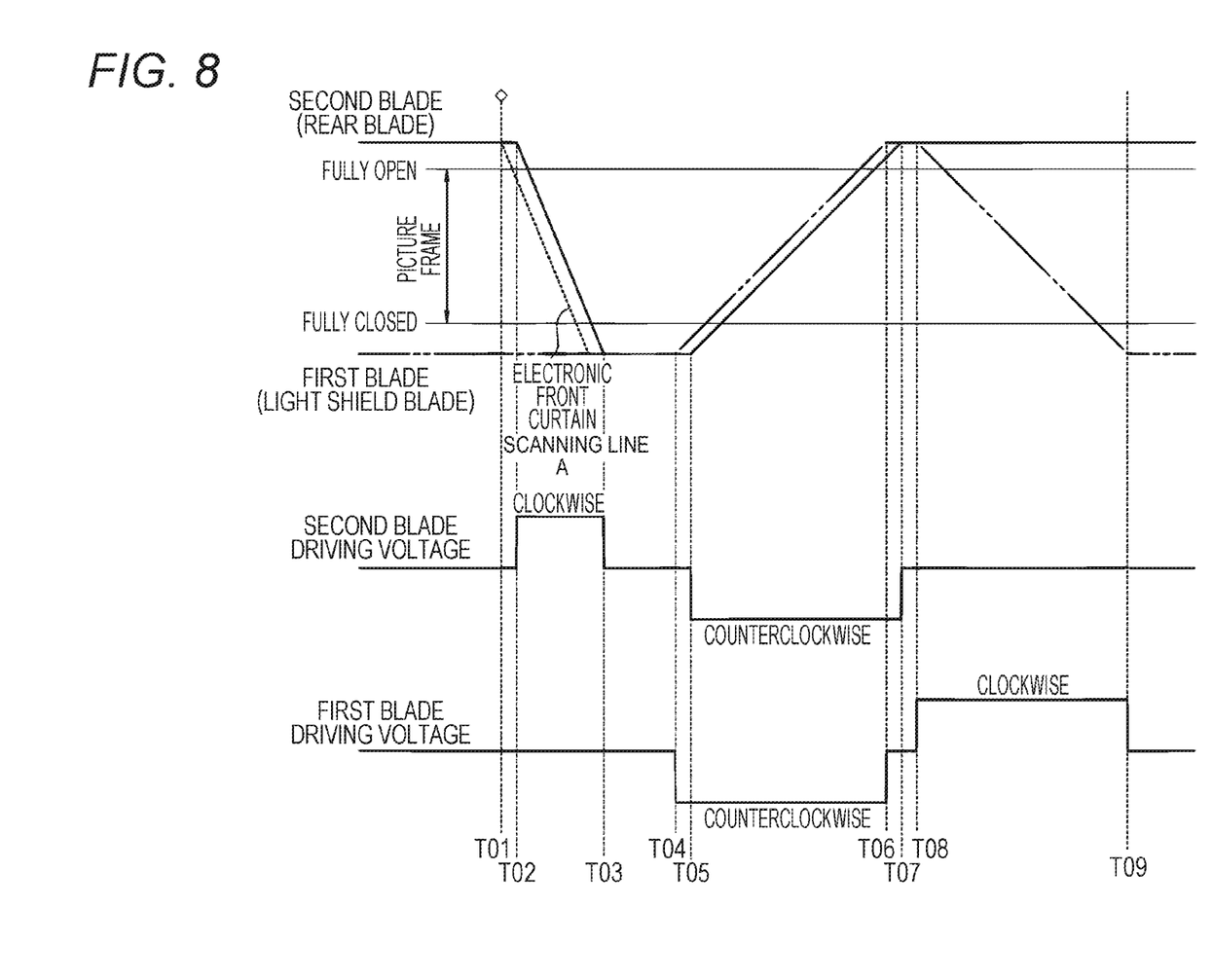
FIG. 8 is a sequence diagram of the operation of a focal-plane shutter according to a first embodiment.

FIG. 7 is a functional block diagram of an imaging device including the focal-plane shutter according to the present embodiment. FIG. 7 shows the first blade electromagnetic actuator 61 and the second blade electromagnetic actuator 62 in the focal-plane shutter according to the present embodiment. The imaging device including the focal-plane shutter according to the present embodiment includes the first blade electromagnetic actuator 61, the second blade electromagnetic actuator 62, an imaging lens 71, a shutter controller 72, an image sensor 73, an image sensor controller 74, an image processor 75, an image display 76, a switch 77, a storage 78, and a system controller 79.

The imaging lens 71 focuses light from the subject onto the image sensor 73. The image sensor 73, which is a photoelectric converter such as a CCD or a CMOS sensor, receives light from the subject through the imaging lens 71 and converts the light to electrical signals to capture an image. The shutter controller 72 controls the voltage and the current applied to the first blade electromagnetic actuator 61 and the second blade electromagnetic actuator 62 to drive their motors. The image sensor controller 74 controls the operation of the image sensor 73. For example, the image sensor controller 74 controls the photoelectric conversion timing of each pixel of the image sensor 73 to perform electronic front curtain scanning A (refer to FIG. 2), which is a reset scan of each horizontal pixel line of the image sensor 73. The image processor 75 performs predetermined image processing on the image captured by the image sensor 73. The image display 76 is, for example, a liquid-crystal display and presents various views. For example, the image display 76 allows the user to view an image to be captured. The switch 77 detects a user operation such as a release operation. The storage 78 stores the captured image processed by the image processor 75. The system controller 79 collectively controls the operations of the shutter controller 72, the image sensor controller 74, the image processor 75, the image display 76, the switch 77, and the storage 78 in accordance with a user operation detected by the switch 77. The image sensor controller 74 is an example of a controller in an aspect of the present invention.

Operation of Focal-Plane Shutter

The operation of the imaging device including the focal-plane shutter according to the present embodiment for capturing an image will now be described in detail with reference to the sequence diagram in FIG. 8 and FIGS. 1 to 7. The sequence diagram in FIG. 8 indicates times T01 to T09, at which the focal-plane shutter enters predetermined states.

FIG. 1 shows a set state in which image capturing is ready. In the set state, the first blade 2 is under the upward urging force of the first blade bias spring 42b, and the second blade 3 is under the downward urging force of the second blade bias spring 52b. In other words, the first blade 2 and the second blade 3 are under the urging forces acting in the directions to close the opening 1a. In the set state, the opening 1a in a fully open state allows the subject image received by the image sensor 73 to be viewed on the image display 76.

In the set state, when the shutter is released to start light exposure (T01), the electronic front curtain scanning line A (refer to FIG. 2) of the image sensor 73 controlled by the image sensor controller 74 moves from the upper end to the lower end of the image sensor 73 to start capturing an image. The second blade electromagnetic actuator 62 then starts operating, and the second blade drive pin 53 rotates clockwise. Thus, the second blade 3 starts moving downward (T02) to close the opening 1a. When the second blade 3 closes the opening, the downward urging force applied to the second blade 3 increases the initial velocity immediately after the blade starts moving as compared with when no urging force is applied from the second blade bias spring 52b, thus achieving a higher shutter speed. While the second blade 3 is moving, a pseudo-slit is formed for image capturing between the electronic front curtain scanning line A functioning as a front curtain and controlled by the image sensor 73 and the second blade 3 functioning as a rear blade. FIG. 2 shows the shutter in which the second blade 3 is closing the opening 1a.

When the electronic front curtain scanning line A reaches the lower end of the image sensor 73 and then the second blade 3 stops moving (T03), the second blade 3 closes the opening 1a, and the image capturing operation completes. FIG. 3 shows the shutter in which the second blade 3 has closed the opening 1a.

Subsequently, setting for the subsequent image capturing operation starts. The first blade electromagnetic actuator 61 first operates to rotate the first blade drive pin 43 counterclockwise. Thus, the first blade 2 functioning as a light shield blade starts moving upward (T04). When the first blade 2 closes the opening, the upward urging force applied to the first blade 2 from the first blade bias spring 42b increases the initial velocity immediately after the start of the blade movement as compared with when no urging force is applied, thus achieving more prompt setting.

Subsequently, the second blade 3 starts moving upward with the first blade 2 and the second blade 3 overlapping each other without leaving a gap between them over the opening 1a (T05). In this state, the second blade electromagnetic actuator 62 operates to rotate the second blade drive pin 53 counterclockwise. The second blade 3, under the downward urging force applied from the second blade bias spring 52b, starts moving slowly as compared with when no urging force is applied. The upper end of the first blade 2 thus does not move beyond the lower end of the second blade 3. FIG. 4 shows this state in which the first blade 2 and the second blade 3 overlapping each other are moving while closing the opening 1a.

The first blade 2 closes the opening 1a (T06), whereas the second blade 3 uncovers the opening 1a (T07). FIG. 5 shows this state. The image data representing the subject image captured by the image sensor 73 is transferred to the image processor 75 while the opening 1a is closed to block light.

After the data transfer from the image sensor completes, the first blade 2 starts moving downward to uncover the opening 1a (T08). In this state, the first blade electromagnetic actuator 61 operates to rotate the first blade drive pin 43 clockwise. When the first blade 2 reaches a lowermost position, the focal-plane shutter returns to the state in FIG. 1, in which the setting is complete (T09) and is ready for the subsequent image capturing operation.

The focal-plane shutter operates in this manner during image capturing and during setting after image capturing.

In the present embodiment, the second blade 3 functions as the rear blade while moving downward. In other examples in which the first blade 2 functions as the rear blade while moving upward, the focal-plane shutter operates in substantially the same manner as in the present embodiment except that the movements of the first blade 2 and the second blade 3 are reversed. In this case, the electronic front curtain scanning line A of the image sensor 73 scans from the lower end to the upper end of the image sensor 73.

In the present embodiment, although the first blade 2 and the second blade 3 are driven by the electromagnetic actuators, each blade may be driven by a known drive spring during image capturing. In other cases, the blade functioning as the light shield blade may be driven by an electromagnetic actuator, and the blade functioning as the rear blade during image capturing may be driven by a drive spring.

2. Second Embodiment

A focal-plane shutter according to the present embodiment includes urging members that urge a first blade and a second blade in the directions to close an opening. In some cases, the first blade functions as a light shield blade, and the second blade functions as a rear blade. In other cases, the second blade functions as a light shield blade, and the first blade functions as a rear blade. Electronic front curtain scanning is used to capture an image. Although the focal-plane shutter according to the present embodiment has the same structure as in the first embodiment, the image capturing operation is different. In the present embodiment, an image is captured before one of the first blade and the second blade that functions as a light shield blade fully uncovers the opening. The second embodiment will be described focusing on its differences from the first embodiment.

Figure 9:
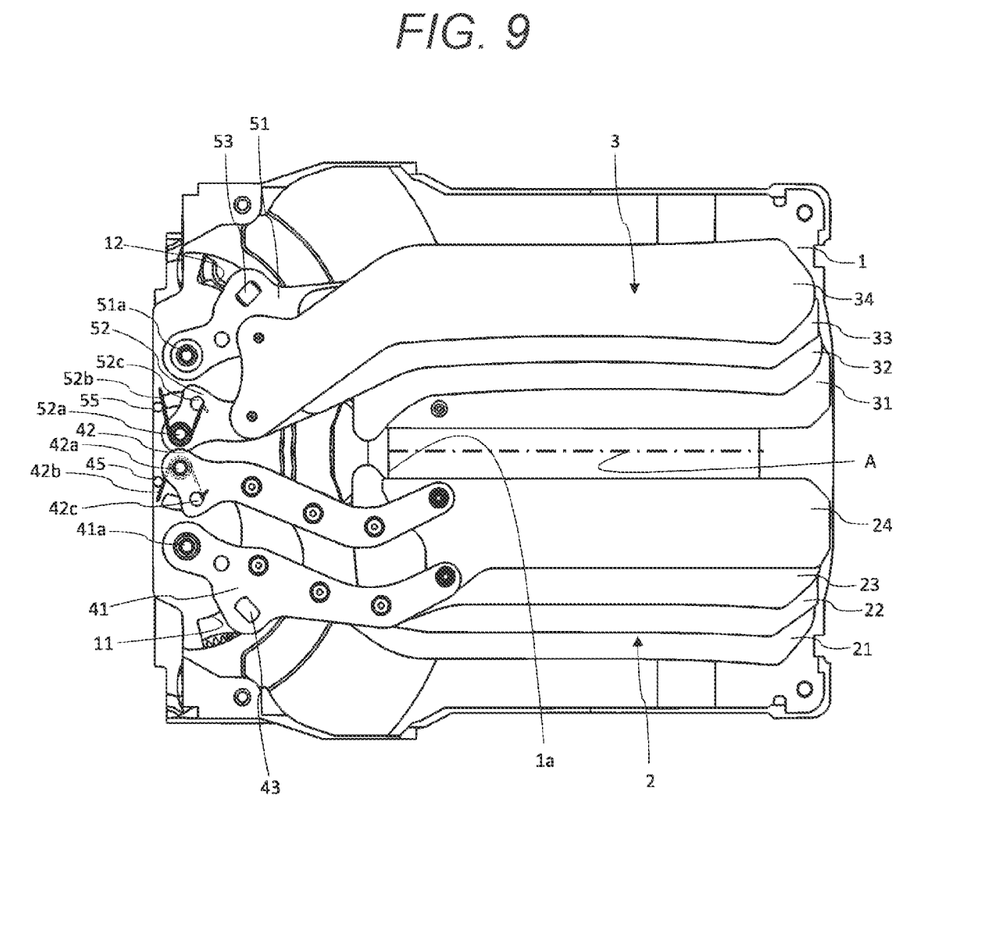
FIG. 9 is a plan view of the focal-plane shutter with the first blade and the second blade moving while leaving a slit, showing the inside of the blade chamber without the support base plate or the intermediate plate.
Figure 10:
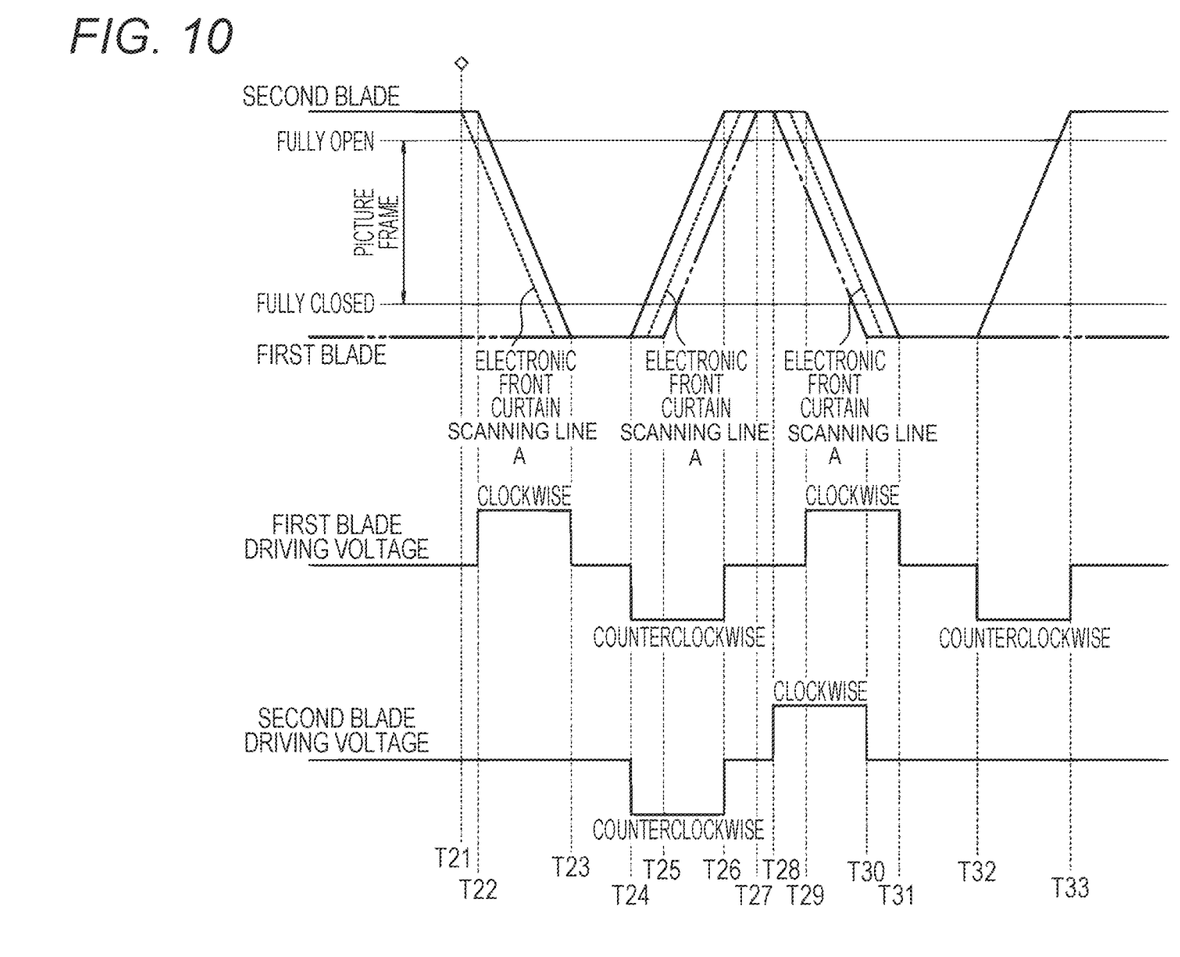
FIG. 10 is a sequence diagram of the operation of a focal-plane shutter according to a second embodiment.

FIGS. 1, 2, 3, 9, and 5 show the states of the focal-plane shutter in the present embodiment. FIGS. 1, 2, 3, and 5 are the same as in the first embodiment. FIG. 9 is a plan view of the focal-plane shutter with the first blade and the second blade moving while leaving a slit. As described later, the focal-plane shutter according to the present embodiment sequentially changes its state in the order illustrated in FIGS. 1, 2, 3, 9, to 5 during image capturing.

Operation of Focal-Plane Shutter

The operation of the imaging device including the focal-plane shutter according to the present embodiment for capturing an image will now be described in detail with reference to the sequence diagram of FIG. 10 and FIGS. 1, 2, 3, 9, and 5. The sequence diagram of FIG. 10 indicates times T21 to T33, at which the focal-plane shutter enters predetermined states.

FIG. 1 shows a set state in which image capturing is ready. In the set state, the first blade 2 is under the upward urging force of the first blade bias spring 42b, and the second blade 3 is under the downward urging force of the second blade bias spring 52b. In other words, the first blade 2 and the second blade 3 are under the urging forces acting in the directions to close the opening 1a.

In the set state, when the shutter is released to start light exposure, the electronic front curtain scanning line A controlled by the image sensor 73 moves from the upper end to the lower end of the image sensor 73 (T21) to start capturing an image. The second blade electromagnetic actuator 62 then starts operating, and the second blade drive pin 53 rotates clockwise. Thus, the second blade 3 starts moving downward (T22) to close the opening 1a. When the second blade 3 closes the opening, the downward urging force applied from the second blade bias spring 52b to the second blade 3 increases the initial velocity immediately after the blade starts moving as compared with when no urging force is applied, thus achieving a higher shutter speed. While the second blade 3 is moving, a pseudo-slit is formed for image capturing between the electronic front curtain scanning line A functioning as a front curtain and controlled by the image sensor 73 and the second blade 3 functioning as a rear blade. FIG. 2 shows the shutter in which the second blade 3 is closing the opening 1a.

When the second blade 3 closes the opening 1a and stops moving (T23), the image capturing operation completes. FIG. 3 shows the shutter in which the second blade 3 has closed the opening 1a. With the opening 1a closed, the data representing the image captured by the image sensor 73 is transferred to the image processor 75.

The subsequent image capturing operation starts. The second blade electromagnetic actuator 62 operates to rotate the second blade drive pin 53 counterclockwise, and thus the second blade 3 starts moving upward (T24).

The electronic front curtain scanning operates as controlled by the image sensor. The scanning line A of the electronic front curtain scanning moves upward below the lower end of the second blade 3 moving upward. Subsequently, the first blade electromagnetic actuator 61 starts operating to rotate the first blade drive pin 43 counterclockwise. Thus, the first blade 2 starts moving upward (T25) to close the opening 1a. FIG. 9 shows this state. Although the second blade 3 and the first blade 2 leave a slit between them, an image is actually captured through a pseudo-slit formed between the electronic front curtain scanning line A and the first blade 2.

Subsequently, the second blade 3 uncovers the opening 1a and retracts to above the opening 1a (T26). When the first blade 2 closes the opening 1a and extends to above the opening 1a, the image capturing operation completes (T27). When the first blade 2 closes the opening, the upward urging force applied to the first blade 2 from the first blade bias spring 42b increases the initial velocity immediately after the blade starts moving as compared with when no urging force is applied. This achieves a higher shutter speed. This also eliminates the operation for setting, thus increasing the speed of consecutive shooting. With the opening 1a closed, the data representing the image captured by the image sensor 73 is transferred to the image processor 75. FIG. 5 shows this state.

The subsequent image capturing operation starts consecutively. The first electromagnetic actuator 61 operates to rotate the first blade drive pin 43 clockwise, and thus the first blade 2 starts moving downward to start uncovering the opening 1a (T28).

The electronic front curtain scanning A operates as controlled by the image sensor. The electronic front curtain scanning line A moves downward above the upper end of the first blade 2 moving downward. Subsequently, the second electromagnetic actuator 62 starts operating to rotate the second blade drive pin 53 clockwise. Thus, the second blade 3 starts moving downward (T29) to close the opening 1a.

Subsequently, the first blade 2 uncovers the opening 1a and retracts to below the opening 1a (T30). When the second blade 3 closes the opening 1a and extends to below the opening 1a, the image capturing operation completes (T31). In this case as well, the initial velocity of the second blade 3 increases as compared with when no urging member is provided, thus achieving a higher shutter speed. This also eliminates the operation for setting, thus increasing the speed of consecutive shooting. With the opening 1a closed, the data representing the image captured by the image sensor 73 is transferred to the image processor 75. FIG. 3 shows this state.

After the consecutive capturing operation, the second blade 3 starts moving to uncover the opening 1a with the first blade 2 still uncovering the opening 1a (T32). The second blade 3 moves upward until the opening 1a is fully uncovered (T33), and the focal-plane shutter returns to the state in FIG. 1.

When the consecutive image capturing operation is repeated, the operation of T24 to T27 or T24 to T31 is repeated. When the consecutive image capturing operation completes, the second blade 3 (or the first blade 2) covering the opening 1a moves in a direction to uncover the opening 1a, and the focal-plane shutter returns to the set state in FIG. 1 in which the opening 1a is uncovered, and waits for a subsequent image capturing operation.

The focal-plane shutter operates in this manner during image capturing and during setting after image capturing.

In the present embodiment, image capturing is started with the electronic front curtain scanning and one of the two blades that functions as the rear blade before the other blade functioning as the light shield blade fully uncovers the opening. In addition, consecutive image capturing is enabled while the blades are reciprocating. This image capturing eliminates the operation for setting, thus shortening the time taken to be ready for a subsequent image capturing operation and accordingly increasing the speed of consecutive shooting.

3. Features

The focal-plane shutter with the above structure according to the above embodiments has the example features described below. The structures in the embodiments described below are merely examples of the present invention. The focal-plane shutter according an example of the present invention is not limited to these specific structures.

The focal-plane shutter according to each embodiment is a focal-plane shutter for electronic front curtain scanning, and includes the first blade bias spring 42b and the second blade bias spring 52b that urge the first blade 2 and the second blade 3 in the directions to close the opening 1a. When the first blade 2 and the second blade 3 close the opening 1a, this structure increases the initial velocity immediately after each blade starts moving, thus achieving a higher shutter speed and a higher consecutive shooting speed.

In the focal-plane shutter according to each embodiment, the first blade 2 or the second blade 3, depending on the direction in which the blades move during image capturing, closes the opening later than an electronic scanning line A of an image sensor. The focal-plane shutter with this structure selectively moves the electronic front curtain scanning and the blade functioning as a rear blade during image capturing to reduce the shutter sound and power consumption.

In the focal-plane shutter according to the first embodiment, in image capturing, the first blade 2 moves in the first direction or the second blade 3 moves in the second direction to close the opening 1a from a state in which the opening 1a is uncovered by the first blade 2 and the second blade 3. The focal-plane shutter with this structure can operate using the electronic front curtain scanning.

In the focal-plane shutter according to the second embodiment, an image is captured when the first blade 2 moves in the first direction (upward in the figures) across the opening 1a and when the second blade 3 moves in the second direction (downward in the figures) across the opening 1a. This structure enables high-speed image capturing by, for example, consecutively capturing images with the blades moving in each direction. Additionally, the focal-plane shutter may change the direction in which the blades move during image capturing depending on the orientation of the imaging device with respect to the force of gravity. This controls the blades to move in the direction of gravitational force independently of the orientation of the imaging device, thus enabling switching between different image-capturing modes and adjustment of the quality of the captured image.

In the focal-plane shutter according to the second embodiment, in image capturing, from the state in which the opening 1a is closed by the second blade 3, the second blade 3 and the first blade 2 move while leaving a gap for light to enter the opening 1a. After the opening 1a is closed by the first blade 2, the first blade 2 and the second blade 3 move while leaving a gap for light to enter the opening 1a, and a scanning line A of the electronic front curtain scanning moves within the gap between the first blade 2 and the second blade 3. This structure enables high-speed consecutive image capturing with the blades moving in each direction at substantially the same speed.

The focal-plane shutter according to each embodiment further includes a first electromagnetic actuator 61 that drives the first blade 2 and a second electromagnetic actuator 62 that drives the second blade 3. The focal-plane shutter with this structure drives the first blade 2 and the second blade 3 with the electromagnetic actuators, and appropriately adjusts the balance between the urging forces applied to the first blade 2 and the second blade 3 by the bias springs.

In the focal-plane shutter according to each embodiment, at least one of the first blade 2 or the second blade 3 is driven by a drive spring. The focal-plane shutter with this structure may use a drive spring having a high starting torque for the blade functioning as the rear blade. During image capturing, the drive spring cooperates with the urging member to further increase the initial velocity of the blade.

An imaging device including the focal-plane shutter according to each embodiment achieves, for example, a higher shutter speed, a higher consecutive shooting speed, less sound, and/or more power saving than known imaging devices.

4. Supplemental Examples

Embodiments of the present invention have been described specifically. The embodiments described above are mere examples. The scope of the present invention is not limited to the embodiments, but is construed broadly within the scope understandable by those skilled in the art.

For example, although the first blade 2 and the second blade 3 in the described embodiments each include four blades, the number of blades included in the first or second blade may be changed as appropriate.

In the embodiments, the bias springs 42b and 52b that are torsion springs (helical torsion springs) are described as example urging members. However, leaf springs, helical compression springs, helical tension springs, or their combinations may also be used.

INDUSTRIAL APPLICABILITY

The focal-plane shutter according to embodiments of the present invention is used suitably for imaging devices, such as digital cameras.

What is claimed is:

1. A focal-plane shutter for electronic front curtain scanning, the shutter comprising:
    a base plate having an opening;
    a first blade movable in a first direction to close the opening;
    a second blade movable in a second direction to close the opening, the second direction being opposite to the first direction in which the first blade is movable;
    a first urging member configured to urge the first blade in the first direction to close the opening; and
    a second urging member configured to urge the second blade in the second direction to close the opening, wherein
    in image capturing,
    from the state in which the opening is closed by the second blade, the second blade and the first blade move while leaving a gap for light to enter the opening,
    after the opening is closed by the first blade, the first blade and the second blade move while leaving a gap for light to enter the opening, and
    a scanning line of the electronic front curtain scanning moves within the gap.

2. The focal-plane shutter according to claim 1, wherein in image capturing, the first blade or the second blade closes the opening later than the electronic scanning line of the electronic front curtain.

3. The focal-plane shutter according to claim 1, wherein an image is captured when the first blade moves in the first direction across the opening and when the second blade moves in the second direction across the opening.

4. The focal-plane shutter according to claim 1, further comprising:
    a first electromagnetic actuator configured to drive the first blade; and
    a second electromagnetic actuator configured to drive the second blade.

5. The focal-plane shutter according to claim 1, wherein at least one of the first blade or the second blade is driven by a drive spring in image capturing.

6. An imaging device, comprising:
    the focal-plane shutter according to claim 1.

* * * * *